(12) United States Patent
Gschwind et al.

(10) Patent No.: US 9,384,130 B2
(45) Date of Patent: *Jul. 5, 2016

(54) REWRITING SYMBOL ADDRESS INITIALIZATION SEQUENCES

(71) Applicant: International Business Machines Corporation, Armonk, NY (US)

(72) Inventors: Michael Karl Gschwind, Chappaqua, NY (US); Ulrich Weigand, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,000

(22) Filed: Dec. 15, 2014

(65) Prior Publication Data
US 2016/0124850 A1    May 5, 2016

Related U.S. Application Data (63) Continuation of application No. 14/527,819, filed on Oct. 30, 2014.

(51) Int. Cl.
G06F 9/44 (2006.01)
G06F 12/06 (2006.01)

(52) U.S. Cl.
CPC .... *G06F 12/0646* (2013.01); *G06F 2212/1016* (2013.01); *G06F 2212/1032* (2013.01)

(58) Field of Classification Search
None
See application file for complete search history.

(56) References Cited

U.S. PATENT DOCUMENTS

| | | | |
|---|---|---|---|
| 4,087,856 A * | 5/1978 | Attanasio | 726/23 |
| 5,293,630 A | 3/1994 | Tatge et al. | |
| 5,586,328 A * | 12/1996 | Caron et al. | 717/146 |
| 5,797,014 A | 8/1998 | Gheith | |
| 5,930,509 A * | 7/1999 | Yates et al. | 717/159 |
| 6,110,227 A * | 8/2000 | Marcelais et al. | 717/170 |
| 6,317,870 B1 * | 11/2001 | Mattson, Jr. | G06F 9/4425 712/E9.082 |
| 6,817,014 B2 | 11/2004 | Hundt et al. | |
| 7,171,543 B1 * | 1/2007 | Ronen et al. | 712/209 |
| 7,299,462 B2 | 11/2007 | Shann et al. | |
| 7,861,234 B1 * | 12/2010 | Lobo | G06F 8/52 717/136 |
| 2003/0079215 A1 * | 4/2003 | Hundt | G06F 9/44521 717/164 |

(Continued)

OTHER PUBLICATIONS

JJ, "How to Increase the Memory Limit for 32-bit Applications in Windows 64-bit Os", Aug. 13, 2011, retrieved from: http://www.maketecheasier.com/increase-memory-limit-for-32-bit-applications-in-windows-64-bit-os/.*

(Continued)

*Primary Examiner* — Jue Louie
(74) *Attorney, Agent, or Firm* — Richard A. Wilhelm; Steven L. Bennett (57) ABSTRACT

A system includes a memory to store a linker and one or modules, and a processor, communicatively coupled to the memory. The computer system is configured to recognize a first symbol address initialization sequence in a module. The system determines whether the first symbol address initialization sequence is a candidate for replacement, determines whether to replace the first symbol address initialization sequence with a second symbol address initialization sequence, and replaces the first symbol address initialization sequence with the second symbol address instruction sequence when it is determined to replace the first symbol address initialization sequence with the second symbol address initialization sequence.

13 Claims, 6 Drawing Sheets

(56) References Cited

U.S. PATENT DOCUMENTS

| | | | |
|---|---|---|---|
| 2003/0135848 A1* | 7/2003 | Krishnan | G06F 9/4426 717/158 |
| 2008/0126742 A1 | 5/2008 | Shupak et al. | |
| 2008/0288919 A1 | 11/2008 | Hodges et al. | |
| 2009/0187725 A1* | 7/2009 | Mencias et al. | 711/171 |
| 2013/0086570 A1* | 4/2013 | Blainey et al. | 717/165 |
| 2013/0263153 A1 | 10/2013 | Gschwind | |

OTHER PUBLICATIONS

Modra, A., "[Patch 2/9] Change plt stubs to have destination in r12", Message 373, Oct. 30, 2013. Grace Period Disclosure. https://sourceware.org/ml/binutils/2013-10/msg00373.html.

Modra, A., "[Patch 4/9] Add ELFv2 .localentry support", Message 375, Oct. 30, 2013. Grace Period Disclosure. https://sourceware.org/ml/binutils/2013-10/msg00375.html.

Modra, A., "[Patch 5/9] ELFv2 stub, plt and link changes", Message 376, Oct. 30, 2013. Grace Period Disclosure. https://sourceware.org/ml/binutils/2013-10/msg00376.html.

Modra, A., "[Patch 9/9] PowerPC64 ELFv2 support for gold", Message 380, Oct. 30, 2013. Grace Period Disclosure. https://sourceware.org/ml/binutils/2013-10/msg00380.html.

Modra, A., Edit ELFv2 global entry prologue to non-PIC, Message 20, Nov. 4, 2013. Grace Period Disclosure. https://sourceware.org/ml/binutils/2013-11/msg00020.html.

Weigand, U., "[Patch, rs6000] ELFv2 ABI 2/8: Remove function descriptors", Message 1141, Nov. 11, 2013. Grace Period Disclosure. https://gcc.gnu.org/ml/gcc-patches/2013-11/msg01141.html.

Weigand, U., "[Patch] Power PC64 ELFv2 ABI 2/6: Remove function descriptors", Message 315, Nov. 12, 2013. Grace Period Disclosure. https://sourceware.org/ml/libc-alpha/2013-11/msg00315.html.

Weigand, U., "[Patch] Power PC64 ELFv2 ABI 316: PLT local entry point optimization", Message 314, Nov. 12, 2013. Grace Period Disclosure. https://sourceware.org/ml/libc-alpha/2013-11/msg00314.html.

Gschwind et al., "Rewriting Symbol Address Initialization Sequences," U.S. Appl. No. 14/527,819, filed Oct. 30, 2014.

Gschwind et al., "Selection of an Entry Point of a Function Having Multiple Entry Points," U.S. Appl. No. 14/501,127, filed Sep. 30, 2014.

Gschwind et al., "Selection of an Entry Point of a Function Having Multiple Entry Points," U.S. Appl. No. 14/569,974, filed Dec. 15, 2014.

Gschwind et al., "Linking a Function With Dual Entry Points," U.S. Appl. No. 14/525,680, filed Oct. 28, 2014.

Gschwind et al., "Linking a Function With Dual Entry Points," U.S. Appl. No. 14/570,010, filed Dec. 15, 2014.

List of IBM Patents or Patent Applications Treated as Related.

* cited by examiner

REWRITING SYMBOL ADDRESS INITIALIZATION SEQUENCES

BACKGROUND

Statement Regarding Prior Disclosures by the Inventor or a Joint Inventor

The following disclosures are submitted under 35 U.S.C. 102(b)(1)(A): Messages 373 (2013-10), 375 (2013-10), 376 (2013-10), 380 (2013-10), and 20 (2013-11) posted to the GNU Binutils (assembler and linker) website (https://sourceware.org/ml/binutils) as mailing list messages. Message 1141 (2013-11) posted to the GCC (compiler) website (http://gcc.gnu.org/ml/gcc-patches) as a mailing list message. Messages 315 (2013-11) and 314 (2013-11) posted to the glibc (system library and dynamic loader) website (https://sourceware.org/ml/libc-alpha) as mailing list messages.

The present disclosure relates generally to computer systems, and more specifically, to a linker configured to rewrite symbol address initialization sequences. In computer software, an application binary interface (ABI) describes the low-level interface between an application module and the operating system or between the application module and another module. The ABI covers details such as data type, size, and alignment; the calling conventions which control how function arguments are passed and how return values are retrieved; the system call numbers and how an application should make system calls to the operating system; and in the case of a complete operating system ABI, the binary format of object files, program libraries, and so on. Several ABIs (e.g., the Interactive Unix ABI allows a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application startup, occurs before the application is executed on a particular hardware platform.

The compiler works on a single source file (compile unit) at a time to generate object files. The compiler generates object code without knowing the final address or displacement of the code/data. Specifically, the compiler generates object code that will access a table of contents (TOC) for variable values without knowing the final size of the TOC or offsets/addresses of various data sections. Placeholders for this information are left in the object code and updated by the linker. A TOC is a variable address reference table that is utilized, for example in an AIX environment, to access program variables in a manner that supports shared libraries and is data location independent. A similar structure, referred to as a global offset table (GOT), performs a similar function (e.g., indirect and dynamically relocatable access to variables) in a LINUX environment. One difference between a TOC and a GOT is that a TOC may contain actual data, where a GOT only contains addresses (pointers) to data. In the Linux PowerPC 64-bit environment the TOC contains the GOT section plus small data variables.

A static linker combines one or more separately compiled object files derived from distinct source files into a single module, and builds a single GOT and/or TOC for the module that is shared by files in the module. An executing application includes at least one module, a statically linked module typically containing the function main( ) as well as, optionally, several other functions, sometimes also known as the main module. Some applications may be statically linked, that is, all libraries have been statically integrated into the main module. Many applications also make use of shared libraries, sets of utility functions provided by the system or vendors to be dynamically loaded at application runtime and where the program text is often shared between multiple applications.

Each module in a computer program may have a different TOC pointer value. The TOC register or GOT register (referred to hereinafter as the TOC register) may therefore be saved and restored for each function call, either by a procedure linkage table (PLT) stub code segment, or by the callee function in conventions where the TOC register is treated as a preserved (i.e., callee-saved) register.

SUMMARY

Embodiments include a method, system, and computer program product for linking object code. The system includes a memory to store a linker and one or modules, and a processor, communicatively coupled to the memory. The computer system is configured to recognize a first symbol address initialization sequence in a module. In addition, the system determines whether the first symbol address initialization sequence is a candidate for replacement, determines whether to replace the first symbol address initialization sequence with a second symbol address initialization sequence, and replaces the first symbol address initialization sequence with the second symbol address instruction sequence when it is determined to replace the first symbol address initialization sequence with the second symbol address initialization sequence.

In addition, in various embodiments, the system determines whether to replace the first symbol address initialization sequence with the second symbol address initialization sequence by determining that the second symbol address initialization sequence has a second processor resource usage that is less than a first processor resource usage associated with the first symbol address initialization sequence. In some embodiments, the system recognizes the first symbol address initialization sequence in the module by determining that the first symbol address initialization sequence is between a first entry point and a second entry point of a function and the first symbol address instruction sequence includes one or more instructions for loading an address in a table of contents (TOC) register. Further, in various embodiments, the module includes position independent code (PIC), the first symbol address initialization sequence is configured for use with position independent code (PIC), and the second symbol address initialization sequence is configured for use with position dependent code (PDC). Moreover, in various embodiments, the determining of whether to replace the first symbol address initialization sequence with the second symbol address initialization sequence includes determining that a target address of the first symbol address initialization sequence is within the first or last 2 GB of a 64-bit address space.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments for a linker configured to rewrite symbol address initialization sequences are provided, with embodiments being discussed below in detail. The linker may recognize a first, e.g., default, symbol address initialization sequence in an application object file. The initialization sequence may be an instruction sequence used to load a symbol address into a register. The first symbol address initialization sequence may have been inserted into the application object file by a compiler or programmer before link time. The first symbol address initialization sequence has a processor resource usage associated with it when the object file is executed. The linker may determine whether there is an alternative symbol address initialization sequence for initializing the symbol address that uses fewer processor resources, when executed, than the first symbol address initialization sequence. The linker may replace the first symbol address initialization sequence with the alternative symbol address initialization sequence when the alternative initialization sequence uses fewer processor resources than first sequence, thus providing faster processing.

Symbol address initialization sequences may be resource intensive operations when executed on a processor. An example of a symbol address initialization sequence is a table of contents (TOC) pointer value calculation and a load of the calculated value into a TOC pointer value register. While the present disclosure will use a TOC pointer value and a TOC or function address register as examples, in various other embodiments any initialization sequence for any symbol and any register may be used. The TOC pointer value address may need to be initialized when a calling function calls a callee function requiring an alternative TOC pointer value to the one associated with the calling function, e.g., as occurs when a call to an external function is performed. The TOC address initialization sequence may be performed at the beginning of the callee function as a portion of a prologue section. In various other embodiments, a symbol address initialization sequence can be performed at any location in a module as well as in various different modules.

Some of the descriptions of the following examples herein may be in accordance with an exemplary Power® ABI for the Power instruction set architecture (ISA). However, the teachings contained herein may be applied to other ABIs and/or other computer architectures, some of which may number and name equivalent components differently than the Power ABI. Therefore, the examples should not be considered limiting. In various embodiments, different symbol address initialization sequences may be used for particular situations.

When a static module, i.e., a position dependent code (PDC) module, is loaded in the first 2 GB of the address range in Power®, a 32-bit TOC pointer value can be loaded directly, when the address is known, with an initialization sequence of:

| | |
|---|---|
| lis | r2, .TOC.@ha |
| addi | r2,r2,. TOC.@l |

When a module is to be loaded in a region for which the TOC pointer is not loadable by the initialization sequence for a static (PDC) module as above, other implementations may be employed. In various embodiments, an implementation for loading a TOC pointer is based on a position independent code (PIC) sequence, which can load a TOC pointer value at an offset from a well-known address, e.g., an offset of +/−2 GB from an address into register r12, which may be used to, but is not limited to, loading a 32-bit function entry address. An example for a function corresponding to a symbol of (g) may be initialized by the following PIC sequence:

| | |
|---|---|
| addis | r2, r12, (.TOC.-g)@ha |
| addi | r2, r2, (.TOC.-g)@l |

In various embodiments, a general load sequence for a 64-bit address may be generated:

| | |
|---|---|
| lis | r2, .TOC.@highesta |
| addi | r2,r2, .TOC.@highera |
| sldi | r2,r2,32 |
| addis | r2,r2, .TOC.@higha |
| addi | r2,r2, .TOC.@l |

In yet another embodiment, to reduce path length, when a full 64-bit address needs to be initialized which is not within a 32-bit offset distance, an offset may be loaded from memory in accordance with the present invention using the following initialization sequence:

| | |
|---|---|
| .quad | address_offset |
| g: | |
| ld | r2, r12, −8 |
| add | r2, r2, r12 |

The above examples contain different numbers of instructions. In various embodiments, other symbol address initialization sequences having various numbers of instructions may be used.

To generate appropriate application object code, a compiler generally needs to know where a module will be loaded. While this may be accomplished with a compiler flag, this approach requires distribution of a plurality of static libraries, in case they may be linked in a first, second, or other address range, as well as at least one dynamic position-independent library. Furthermore, while compilers can generate different code depending on a load flag, an assembler programmer may generate multiple assembly files, either in distinct source units, or by way of potentially complex macros. It is likely that not all such code version will be provided to the compiler, leading either to a failure to link (e.g., if only a low-address version of a library is provided and a library needs to be loaded into a high address range), or a lower performing version may be provided that offers more flexibility at the expense of performance (such as the general 64-bit load sequence above).

In another aspect, providing multiple libraries for different load ranges (one for each range) can be cumbersome and error prone. Also, while some linkers have been able to extract the appropriate version of functions when they all share a static selection criteria (such as target architecture), those linkers apparently do not permit the selection of the most appropriate of multiple library functions from among multiple library objects. Embodiments disclosed herein allow for a library system that distributes a single object file, and allows that object file to address the needs of all possible execution address ranges by a linker that is capable of replacing a first symbol address initialization sequence with an alternative sequence that meets the need of the address execution range.

Figure 1:
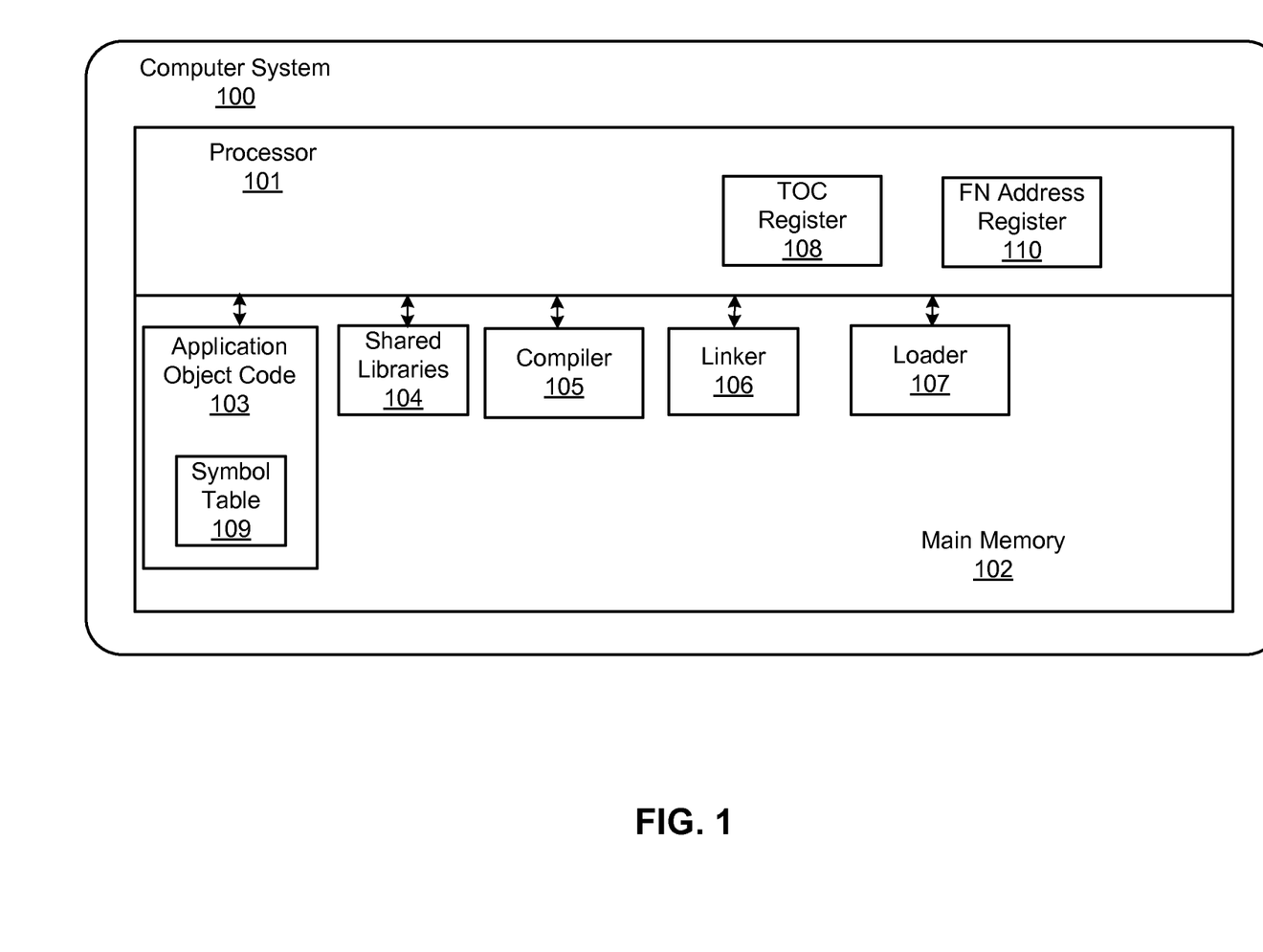
FIG. 1 depicts a computer system having a static linker in accordance with various embodiments.

FIG. 1 illustrates a computer system 100 having a linker 106 that is adapted to rewrite a first symbol address initialization sequence when an alternative symbol address initialization sequence can be implemented that may use fewer processor resources when executed, according to various embodiments. Computer system 100 comprises a processor 101 and a main memory 102. Application object code 103, which is generated from program source code (not shown) by a compiler, such as compiler 105, includes a plurality of functions, and is stored in main memory 102 for execution by processor 101. The application object code 103 may be generated by a compiler that is located on a different computer system from computer system 100. Application object code 103 may include a symbol table 109, which may be generated by the compiler 105 when the application object code 103 is generated. The symbol table 109 may include a data structure that associates each identifier (i.e., function and variable names) in a program's source code with information relating to its declaration or appearance in the source code, such as type, scope level, and/or location. The symbol table 109 may also indicate a function has a plurality of entry points, whether the entry points are local and global entry points, and the distance between the two entry points. The symbol table and its symbol information are further described herein. Shared library code 104 may include functions that are external to application object code 103 and that may be called during execution of application object code 103 via external function calls (i.e., calls to functions in other modules and also referred to herein as global function calls).

Linker 106 and loader 107 may include runtime components; the linker 106 links the application object code 103 before the application object code 103 is loaded by the loader 107. The loader 107 may be referred to as herein as dynamic loader, dynamic linker, or a resolver. The loader 107 may be configured to determine an entry point of a function having a plurality of entry points. In various embodiments, the linker 106 may be configured to determine an entry point of a function having a plurality of entry points. Furthermore, the linker 106 may be configured to rewrite symbol address initialization sequences when an alternative symbol address initialization sequence can be implemented that uses fewer processor resources when executed, as described further within. The function may be from the application object code 103 or the shared libraries 104.

TOC register 108 is located in processor 101. TOC register 108 stores a current value of a TOC pointer for the currently active function of application object code 103 or shared library code 104 (i.e., the function that is currently executing). The TOC register 108 may be general purpose register R2 in some embodiments. In further embodiments of computer systems, such as computer system 100, the TOC register 108 may store a GOT value instead of a TOC pointer value. Function address register 110 is also located in processor 101, and holds an address of a currently executing function. Function address register 110 may be general purpose register R12 in some embodiments. In some embodiments, the computer system 100 may further comprise another object code module that is distinct from the application object code 103 and the shared library code 104, and the other object code module may also contain functions that are called by application object code 103 via external function calls.

Figure 2:
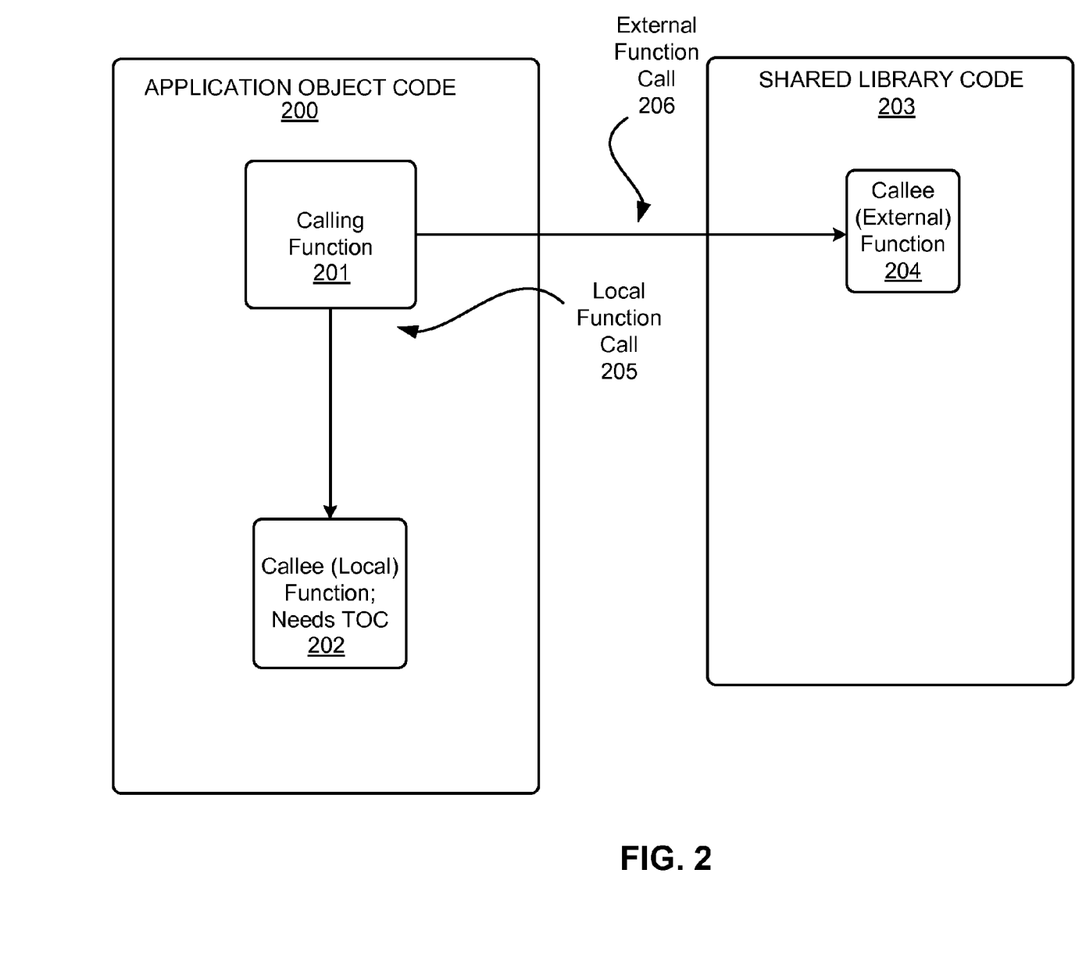
FIG. 2 depicts local and external function calls in accordance with an embodiment.

FIG. 2 illustrates an embodiment of a local function call 205 and an external function call 206. Application object code 200 may include application object code 103 of FIG. 1, and shared library 203 may include shared library code 104 of FIG. 1. Calling function 201 and callee function 202 are part of application object code 200, and callee function 204 is part of shared library 203. If the calling function 201 and the callee function 202 are both part of application object code 200, the callee function 202 is local to the calling function 201 and the call is a local function call 205. Therefore, the calling function 201 and the callee function 202 have the same TOC pointer value. If the calling function 201 is part of the application object code 200, and the callee function 204 is in the shared library 203, then the callee function 204 is external to the calling function 201 and the call is an external function call 206. Therefore, the calling function 201 and the callee function 204 may have different TOC pointer values.

When calling function 201 performs an external function call to callee function 204, and when execution passes from the calling function 201 to the callee function 204, then the value of the TOC pointer of the calling function 201 is saved from TOC register 108 to a stack frame corresponding to the calling function 201 in the runtime stack. Then, the TOC pointer value of callee function 204 is stored in TOC register 108. When the callee function 204 exits and execution passes back to the calling function 201, the value of the TOC pointer of the calling function 201 is restored to the TOC register 108 from the stack frame corresponding to the calling function 201.

FIG. 2 is shown for illustrative purposes only; any number of functions may be included in application object code 200 and shared library 203, and these functions may call one another in any appropriate manner. In some embodiments, the computer system 100 may further comprise another object code module that is distinct from the application object code 103/200 and the shared library code 104/203, and the other object code module may also contain functions that are called by application object code 103/200 via external function calls such as external function call 206. There may also be local function calls between functions that are both within the same shared library code 104/203.

Figure 3:
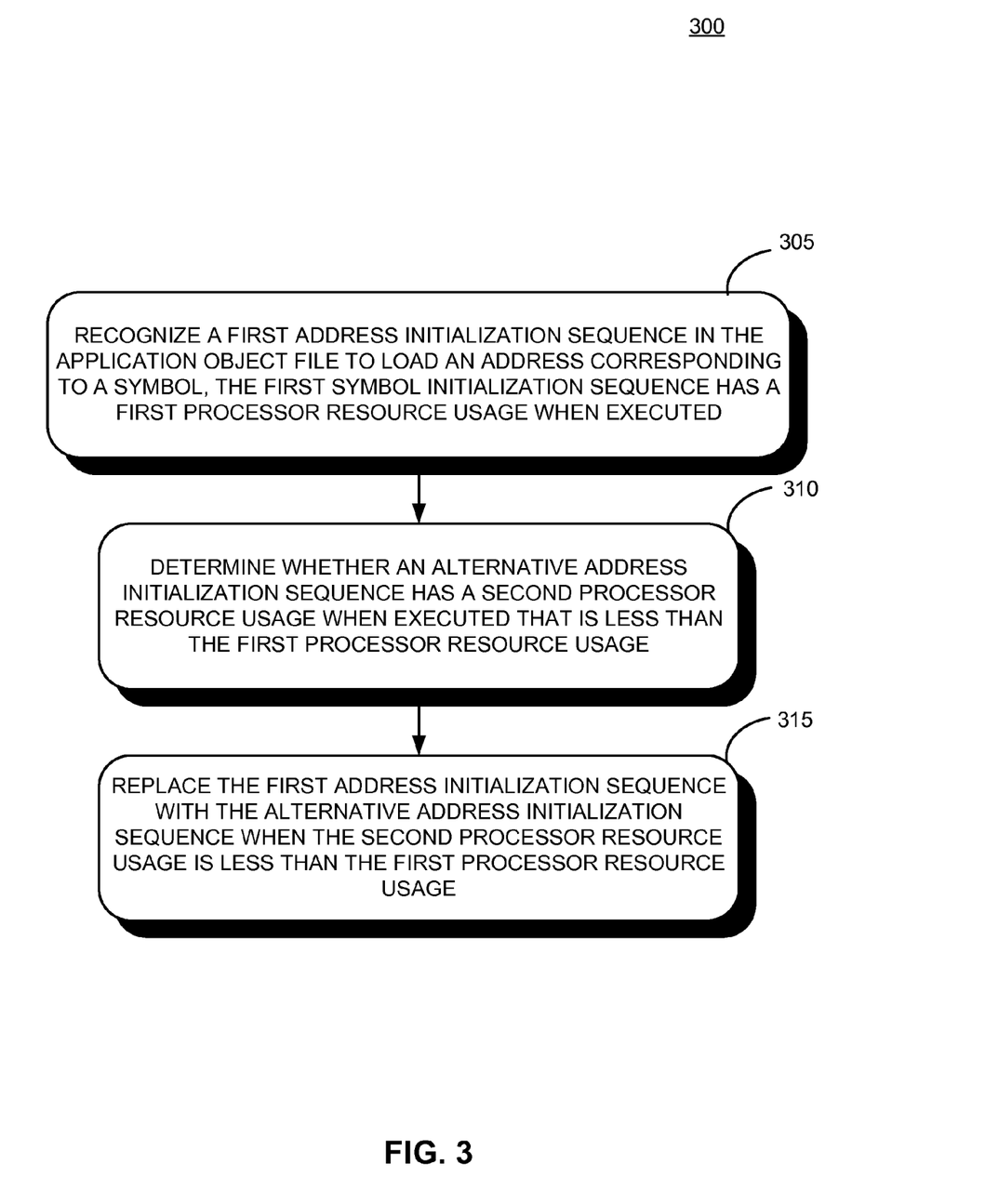
FIG. 3 depicts a process flow for generally rewriting symbol address initialization sequences within the object files in accordance with an embodiment.

FIG. 3 depicts a method 300 that a linker generally performs for rewriting symbol address initialization sequences within the object files in accordance with various embodiments. Prior to the linker 106 rewriting symbol address initialization sequences, a compiler, such as compiler 105, or a programmer may generate a first symbol address initialization sequence within the application object code 103. The first symbol address initialization sequence may be generated in various locations throughout the application object code 103. In various embodiments, the first symbol address initialization sequence may be a default symbol address initialization sequence. In various embodiments, the first symbol address initialization sequence may be a preferred sequence. In various embodiment, the preferred sequence may be a symbol address initialization sequence that provides the most flexibility, allowing the loading of a broadest range of symbol addresses. In various embodiments, the preferred sequence is a PIC sequence allowing the first symbol address initialization sequence to function at arbitrary addresses, possibly established only at dynamic module load time. In various embodiments, the preferred sequence corresponds to a fast sequence in which processor resource usage, when executing the sequence, is less than other sequences. In various embodiments, the first symbol address initialization sequence may be indicated to be stored in a defined region of memory. The defined region may be indicated by symbol information stored in the symbol table 109 or by relocation information with the application object code. In various embodiments, the compiler may insert relocation indicators for various commands of code that have been relocated by the compiler to a different location within the application object code. In at least one embodiment, when a memory region is defined to contain a symbol address initialization sequence, additional properties are asserted and/or guaranteed for the sequence. In one exemplary embodiment, when a symbol address initialization sequence is present and indicated by symbol information stored in the symbol table 109 or relocation information with the application object code, the symbol address initialization sequence is guaranteed to always be executed in its entirety, i.e., no branch targets from branches not corresponding to the symbol address initialization sequence branch to any location between the first and the last instruction of the symbol address initialization sequence.

After compile time and during linking time, the linker, such as linker 106 of FIG. 1, may perform the method 300. In operation 305, the linker 106 may perform a linking step. In the linking step, the linker 106 may recognize the first symbol address initialization sequence in the application object file. The first symbol address initialization sequence has a first processor resource usage when executed and other properties. In operation 310, the linker may determine whether it is feasible to replace the first address sequence with an alternative symbol address initialization sequence and whether replacement is beneficial or desirable, e.g., the alternative sequence has a second processor resource usage, which is less than the first processor resource usage. In other words, operation 310 can determine whether the first symbol address initialization sequence is a candidate for replacement and can determine whether to replace the first symbol address initialization sequence with the second symbol address initialization sequence. In operation 315, the linker may replace the first symbol address initialization sequence with the alternative symbol address initialization sequence when it is beneficial or desirable. If no other alternative symbol address initialization sequence provides a benefit when compared to the first symbol address initialization sequence, then the first symbol address initialization is not replaced.

In operation 305, the linker 106 may recognize the first symbol address initialization sequence in the application object file. The linker 106 may recognize a symbol initialization sequence based on any of the following attributes of a sequence. According to various embodiments, the first symbol address initialization sequence corresponds to a symbol address load sequence at the beginning of a function, e.g., in a prologue section. In various embodiments, the symbol address load sequence at the beginning of the function is a load sequence that is between a first and second function entry point. The first and second function entry points may be demarcated by symbol information associated with the function in the symbol table 109. In various embodiments, the symbol address load sequence is that of a load of a TOC pointer value into a TOC register, e.g., r2. In at least one embodiment, no branch may transfer control at any point between the first and the second entry point in accordance with the definition of the ABI. In various embodiments, the linker 106 recognizes that a load sequence is at the beginning of a function, is between a first and second function entry point, that a symbol address initiation sequence loads a TOC pointer value into a TOC register, or that no branch or control transfer instructions are present between a first and second entry point. In addition, in various embodiments, the linker 106 recognizes that the first symbol address instruction sequence corresponds with a pre-defined symbol address initiation sequence, such as fixed, well-defined initiation sequence that is typically employed by developers or that corresponds with a "model" symbol initialization sequence.

Figure 4:
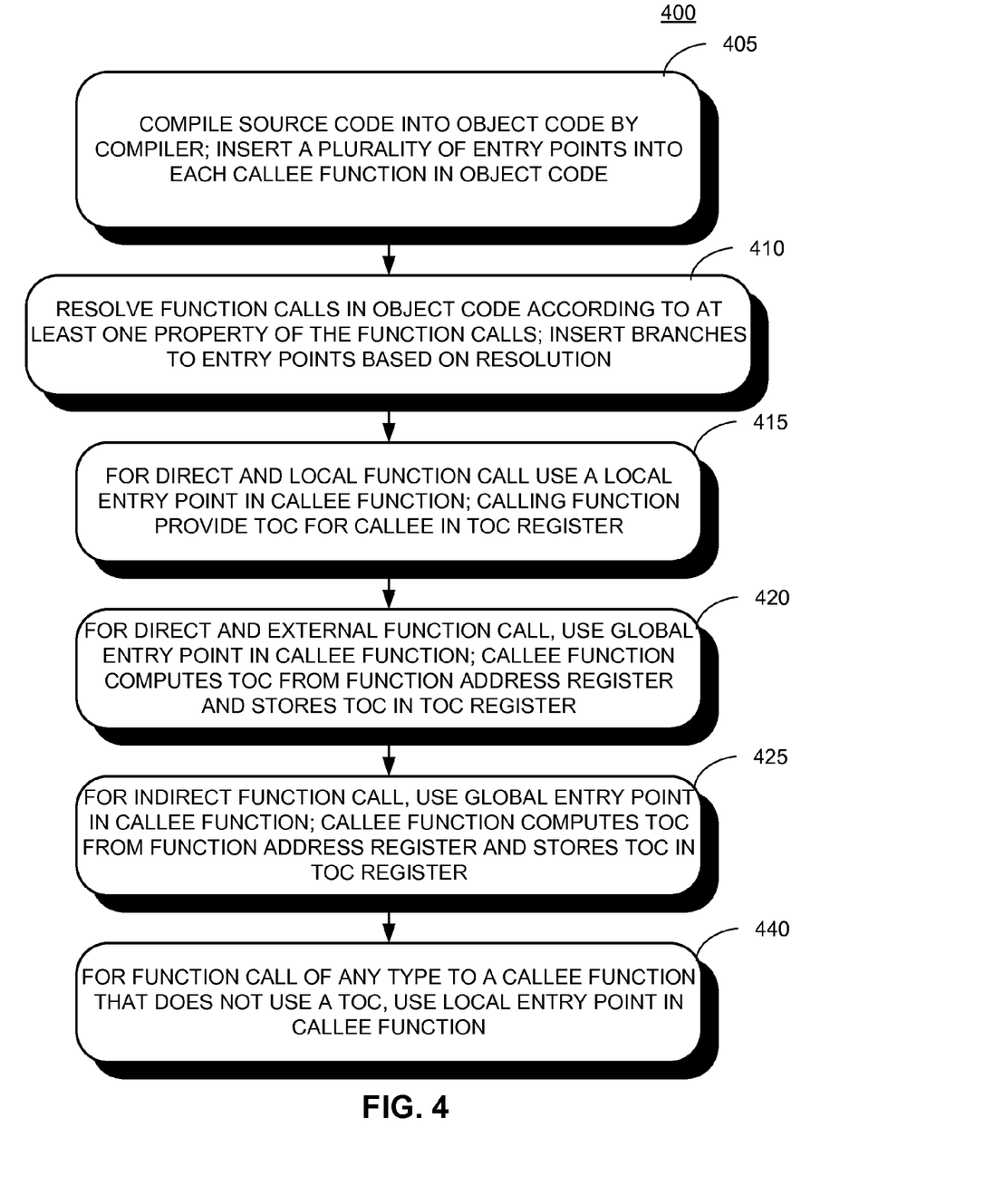
FIG. 4 depicts a process flow for generally resolving a call to a callee function having a plurality of entry points in accordance with an embodiment.

FIG. 4 illustrates an example of a method 400 for selecting one of a plurality of entry points, such as a global entry point and a local entry point, for a callee function in accordance with an embodiment. Although this example refers to a global entry point and a local entry point, a plurality of entry points may be considered as well as entry points defined by other properties besides global or local calls. FIG. 4 is discussed with reference to FIGS. 1, 2, and 3. First, in operation 405, before runtime, a compiler, such as compiler 105, generates application object code 103 (and, in some embodiments, shared library code 104) from program source code (not shown). The compiler that generates application object code 103 (and, in some embodiments, shared library code 104) may be located on another computer system that is distinct from computer system 100. In some embodiments, another compiler on a third distinct computer may generate shared library code 104. During compilation, the compiler 105 may insert multiple entry points and other code. For example, the compiler 105 may insert a global entry point at the beginning of each callee function, followed by prologue code comprising instructions to compute and load the TOC pointer value for the callee function into the TOC register, followed by a local entry point. The prologue code instructions to compute and load the TOC pointer value into the TOC register is an example of the first symbol address initialization sequence described herein. The main body of a function may be located after its local entry point. It is also indicated in the program source code whether each function call is direct or indirect; a direct function call calls the calling function by name, while an indirect function call references a function pointer.

Next, in operation 410, the function calls in the calling functions in the application object code 103 are resolved based on at least one property of the function calls (e.g., local or external). The resolving may be performed by compiler 105, linker 106, or loader 107, in various embodiments; resolution may occur at different times for different function calls in the same application object code 103. The plurality of entry points may be a global entry point and a local entry point, for example. At the time of resolution of a function call, one of either the compiler 105, linker 106, or loader 107 inserts instructions that branch from the function call in the calling function to one of the plurality of entry points of the callee function of the function call, depending on the type of function call (e.g., direct and local, direct and external, or indirect), in addition to other instructions, such as PLT stubs, as needed.

In the example where the plurality entry points of a function are selected based on the at least one property of the function call being local or external, and direct or indirect, operations 415, 420, 425, and 430 may be performed during execution of the application object code 103. For each function call that is encountered during execution of application object code 103, one of operation 415, 420, 425, and 430 is performed. In operation 415, a direct and local function call is executed. For the direct and local function call, the calling and callee functions have the same TOC, which may be provided by the calling function for the callee function in the TOC register 108. Therefore, the function call in the calling function branches to the local entry point in the callee function, skipping the global entry point and the prologue code that includes the callee TOC computation and TOC register initialization instructions (i.e., first symbol address initialization sequence). This reduces processor cycles needed to execute the object code.

In operation 420, a direct and external function call is executed. For the direct and external function call, the calling and callee functions may have different TOC values, so the callee function may calculate its TOC pointer value and load the calculated TOC pointer value in the TOC register 108. Therefore, the function call in the calling function branches to the global entry point in the callee function, executes the prologue code to perform TOC pointer value computation, saves the computed TOC pointer value in the TOC register 108, and then proceeds past the local entry point into the body of the callee function.

In operation 425, an indirect function call is executed. For the indirect function call, the TOC pointer value of the callee function may not be known in advance, so the callee function may calculate its TOC pointer value and load the calculated TOC pointer into the TOC register 108. Therefore, the function call in the calling function branches to the global entry point in the callee function, executes the prologue code to perform TOC pointer value computation and loads the computed TOC pointer value into the TOC register 108, and then proceeds past the local entry point into the body of the callee function.

Lastly, in operation 430, a function call to a callee function that does not use a TOC pointer value in the TOC register 108 is executed. In some embodiments, for such a function call, the local entry point in the callee function may be used, regardless of the type of the function call. In further embodiments, the compiler may determine at compile time that the callee function does not use a TOC register for a TOC pointer value, and, based on that determination, omit insertion of the prologue code to establish a TOC pointer value into the callee function during operation 405.

Figure 5:
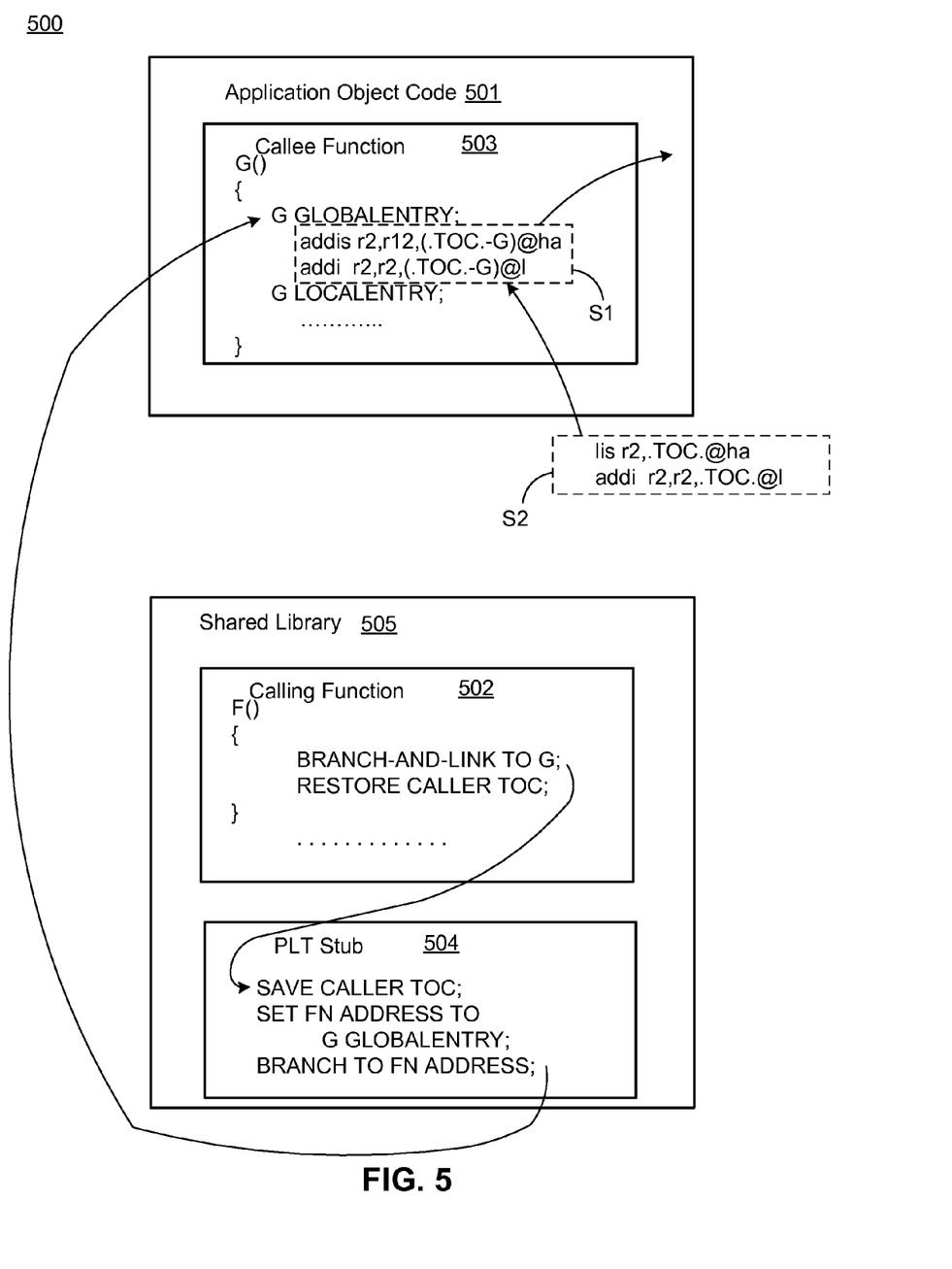
FIG. 5 depicts an example of rewriting a symbol address initialization sequence in a prologue of a multiple entry point function of a position-independent module in accordance with an embodiment.

FIG. 5 depicts an example of rewriting symbol address initialization sequences in prologue code used to load a TOC pointer value in a multiple entry point function in accordance with an embodiment. FIG. 5 is an example of a linker, such as linker 106 of FIG. 1, linking code in a module containing position independent code (PIC) as a first (e.g., default) symbol address initialization sequence. In FIG. 5, application 501 includes a global function G( ) 503 having a global entry point and at least one other entry point (e.g., a local entry point). A PIC symbol address initialization sequence S1 is included in G( ) 503. The use of position independent code (PIC) may allow dynamically loadable object files to have a more flexible symbol address initialization sequence, which may allow the object files to be used in conjunction with the generation and linkage of dynamic shared objects (DSOs). The first address initialization sequence may be inserted by a developer or a compiler. In various embodiments, even though the PIC sequence is more flexible, there may be more desirable to use an alternative symbol address initialization sequence in certain places within an object file in place of the first symbol address initialization sequence.

FIG. 5 illustrates an example of use of a global entry point for an external and direct function call. When application 501 is executing, the application may call a function in a library, such as the shared library 505. In addition, when the called function in the library 505 is invoked, the called function itself may make a call back to the application 501. The call back is an external call to a global entry point of a function in the application. This is the scenario depicted in the example 500 of FIG. 5. The function call from calling function F( ) 502 to callee function G( ) 503 is resolved to be an external function call at load time. The function call from calling function F( ) 502 to callee function G( ) 503 is also determined to be a direct function call because G( ) is called in F( ) by name. Therefore, the linker 106 generates a PLT stub 504 and the linker 106 or loader 107 inserts a branch to the PLT stub 504 into calling function F( ) 502. The PLT stub 504 stores the TOC of the calling function F( ) 502 in a save area of the stack frame associated with F( ) in the runtime stack, loads a final destination address to be determined by the loader 107 at load time into the function address register 110, e.g., r12, and then branches to the address in the function address register 110. In this example, the loader 107 determines that address of the global entry point in callee function G( ) 503 should be used. The linker 106 also inserts code into the calling function F( ) to restore its TOC from the stack frame associated with F( ) in the runtime stack after the call to G( ) has returned. After entering callee function G( ) 503 at the global entry point, the prologue code performs a calculation of the TOC pointer value for callee function G( ) 503 and loads the calculated TOC pointer value into the TOC register 108, e.g., r2, before proceeding with execution of the callee function G( ) 503. The TOC pointer value for callee function G( ) 503 may be calculated based on adding an offset value to the value that is stored in the function address register 110.

A portion of the prologue code may include an exemplary position independent code (PIC) version of a symbol address initialization sequence S1, which in this example is the following TOC pointer value calculation and load sequence for a 32 b address:

| | |
|---|---|
| addis | r2, r12, (.TOC.-G)@ha |
| addi | r2, r2, (.TOC.-G)@l |

This PIC sequence S1 provides flexibility in that addresses to the TOC pointer value can be calculated from well-known addresses in other registers, such as function address register r12, even when the code of function G is loaded to an arbitrary location (as long as the TOC value is within a 2 GB range in either direction of the start address of function G). The PIC symbol address initialization sequence S1 calculates the TOC pointer value from a known address stored in register r12.

However, in various functions the PIC sequence above may not be desirable relative to other possible sequences in that it may use greater processor resources than an alternative symbol address initialization sequence. For example, when the linker is linking the final executable, the PIC sequence S1 may result in interlocks because the symbol address initialization is dependent on the loading of the function address into register R12, preventing its parallel execution with the R12 load sequence even if branch prediction has correctly predicted the start address of function G. Therefore, a position dependent code (PDC) sequence may be more desirable than a PIC sequence in that it creates a TOC load sequence which is not dependent on the start address of function G having been loaded into the function address register, such as, for example, register R12, in one exemplary embodiment. The linker 106 can determine whether the conditions exist that allow for rewriting of the PIC symbol address initialization sequence. Some conditions may include that the PIC target address is within the first or last 2 GB of a 64-bit address space (such that it may be loaded with a two instruction sequence consisting of an initial lis and a dependent addi) or that there are no branches into the middle of the PIC sequence. In at least one embodiment, the latter may be guaranteed by one or more of an ABI convention specifying that a sequence between a first and a second function entry point may not be branched into, or that a symbol address initialization sequence that is subject to a defined relocation specifying such symbol may not be jumped into. In other embodiment, a static linker may perform code analysis to determine that a symbol address initialization sequence between a first and a second function entry point may not be branched into or that a symbol address initialization sequence that is subject to a defined relocation specifying such symbol may not be jumped into. In at least one such exemplary embodiment, an assumption that no undiscoverable code exists in accordance with the rules of an exemplary ABI is made.

In example 500 of FIG. 5, the linker 106 rewrites the PIC symbol address initialization sequence S1 in the prologue code in the callee function 503 by replacing it with the PDC symbol address initialization sequence S2 for a 32*b* address set forth below:

lis r2,.TOC. @ha
addi r2,r2,.TOC. @l

The symbol address initialization sequence S2 determines a known TOC pointer value and saves it within the register r2 In at least one embodiment, when the symbol address initialization sequence S2 is generated and emitted into the linked output object file, it is inserted into the generated object file in lieu of the original symbol address initialization sequence S1.

An external and direct call from a shared library module to a global entry point of a function that includes a first symbol address initialization sequence for PIC, as shown in FIG. 5, is one example of rewriting a symbol address initialization sequence. Another example is an indirect call, i.e., a function call that identifies the called function with a function pointer, from any module, including an application module, to a global function entry point in any other module, including another application module. In an indirect call from one module to another module in an application, the symbol address initialization sequence is typically for PIC. In an embodiment, the PIC symbol address initialization sequence in the callee function is rewritten as a symbol address initialization sequence for PDC.

In various embodiments, in accordance with an ABI specification, when the first symbol address initialization sequence corresponds to code between a first and a second entry point, no branches are allowed to target addresses between a first and a second function entry point. This specification may ensure that either the first symbol address initialization sequence or the alternative symbol address initialization sequence is executed in its entirety. This ensures that a code rewrite does not lead to corrupted execution scenarios. In various embodiments, no guarantee is provided, and analysis is performed by the linker 106 to determine whether rewriting the first symbol address initialization sequence is safe. In yet other various embodiments, a linker switch provides an assurance to the linker 106 that rewriting is safe. In various embodiments, relocation information indicates the safety of such a sequence rewrite.

Figure 6:
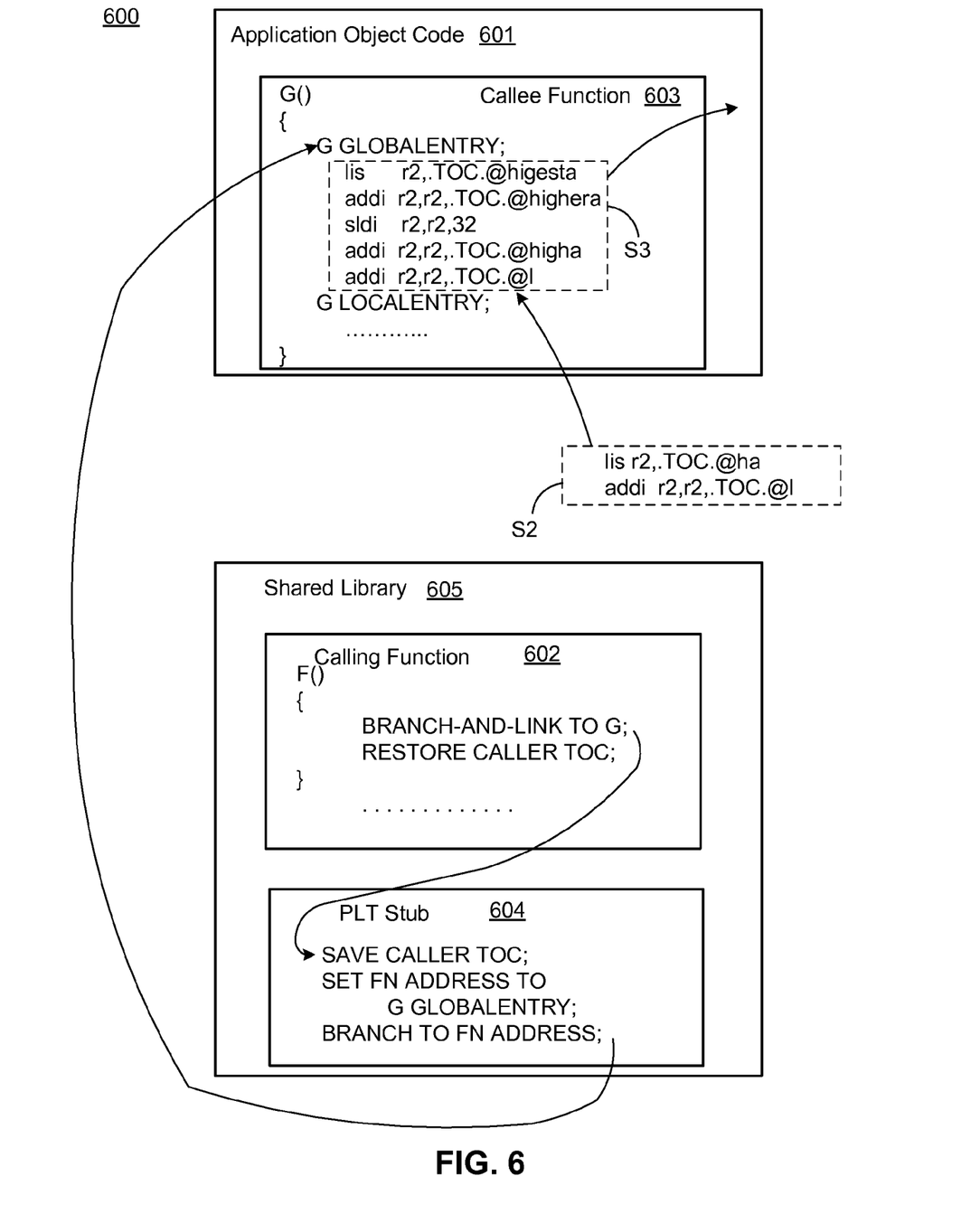
FIG. 6 depicts an example of rewriting a symbol address initialization sequence in a prologue of a multiple entry point function of a position-dependent module in accordance with an embodiment.

FIG. 6 depicts an example 600 of rewriting a symbol address initialization sequence in prologue code used to load a TOC pointer value of a multiple entry point function in accordance with an embodiment. FIG. 6 is an example of a linker linking code from at least one object file containing position dependent code (PDC) and rewriting a first (e.g., default) symbol address initialization sequence. The exemplary static (PDC) objects shown herein have a more flexible symbol address initialization sequence to allow the object to be linked to modules at a variety of known addresses. In various embodiments, the symbol address initialization sequence corresponds to a PDC symbol initialization sequence for a long address, e.g., a 64*b* address, that includes the following, relatively long five instruction sequence:

| lis   | r2, .TOC.@highesta   |
| addi  | r2,r2, .TOC.@highera |
| sldi  | r2,r2,32             |
| addis | r2,r2, .TOC.@higha   |
| addi  | r2,r2, .TOC.@l       |

This instruction sequence, designated S3 in FIG. 6, is one example for loading a TOC pointer value. The instruction sequence S3 is long in comparison to the instruction sequence S2.

Like the example in FIG. 5, the example in FIG. 6 illustrates use of a global entry point for an external and direct function call. The description of a call from a calling function to an external callee function provided with respect to FIG. 5 also applies to the example in FIG. 6 and is not repeated here.

In various embodiments, the symbol address initialization sequence S3 in callee function 603 may be rewritten by the linker 106 to a sequence for a short instruction, such as the PDC symbol address initialization sequence S2 for a 32*b* address set forth below:

lis r2,TOC@ha
addi r2,r2,TOC@l

In various embodiments, the rewritten callee function 603 that includes sequence S2 may use fewer instructions and fewer processor resources than the instruction sequence S3. It should be appreciated that the sequence S3 is but one example of many possible first (default) symbol address initialization sequences and that the replacement sequence S2 is but one example of many possible second (rewritten or replacement) symbol address initialization sequences. In various embodiments, the rewritten code may be a different symbol address initialization sequence. In various embodiments, the instruction sequence S2 may be a short instruction sequence and the linker 106 may rewrite the shorter instruction sequence into a longer instruction sequence such as the five instruction sequence S3 above.

In various embodiments, changing the number of instructions of the prologue code for the symbol address initialization sequence changes the location of one or more entry points within the callee function 603. Therefore, in various embodiments, one or more addresses of the entry points of the callee function are updated by the linker 106.

In various embodiments, a combination of the compiler and linker or a linker alone may be able to resolve a function call to a callee function having a plurality of entry points. A static linker, such as static linker 106 may be capable of determining which entry point a call from a calling function enters a callee function. At link time, an object file is received by the static linker 106. The linker 106 identifies, from a calling function of the object code 103, a first function call to a callee function. The callee function may be part of the application object code 103 as a local function or part of another module such as in the shared library 104 as a global/external function. Generally, calls to external functions may require a TOC pointer value of the calling function to be saved from a TOC register, while calls to local functions may not need a TOC pointer value to be saved since the callee function may share the same TOC pointer value as the calling function. However, in some instances calls to local functions may require a TOC pointer value save as described herein.

During link time, the linker 106 may receive information about the callee function and its function entry points by way of symbol indicators stored in the symbol table 109. The linker 106 may read the symbol indicators by extracting symbol information. The linker 106 may extract symbol information such as, but not limited to, information that indicates the use of the function, TOC register usage, whether multiple entry points are present in the function, and if there are multiple entry points, the distance between a first entry point and a second entry point.

The symbol information may be located in different fields. For example, the symbol table 109 includes TOC register usage indicators that may indicate any functions (local or external) that do not need a TOC pointer value to be stored in TOC register 108, but rather may use TOC register 108 as an application register. A TOC register usage indicator for a function may comprise a "st_other" field associated with the function in the symbol table 109, and may be a 1-bit field in some embodiments. In further embodiments, the "st_other" field may be any appropriate length, such as a 3-bit field. Likewise, the distance between a first entry point and a second entry point may use the "st_other" field to specify the number of instructions between the two entry points.

In various embodiments, when a symbol address initialization sequence is rewritten and the rewritten sequence has a different number of instructions than the original or first symbol address initialization sequence, the linker 106 may update the symbol table 109. In one aspect of updating a symbol table, the symbol table may be updated to change the primary entry point of a symbol, such as the global entry point. In another aspect of updating the symbol table, the linker may update the "st_other" field to adjust the distance between the first entry point and the second entry point due to the change in the number of prologue code instructions between the entry points. In various embodiments, accounting for the change in the number of instructions between two entry points due to rewriting a symbol address initialization sequence may be made in a manner consistent with preferred, typical, or expected branch target address alignments. In various embodiments, accounting for the change in the number of instructions between entry points due to a change of a longer initialization sequence to a shorter initialization sequence may also be accomplished by padding the rewritten symbol address initialization sequence with instructions so as to maintain the original code alignment, e.g., with one or more instructions corresponding to operations not modifying the state of the application, such as, for example, a "NOP" (no operation) instruction, or instructions whose semantics correspond to not performing an operation (such as, for example, including, but not limited to, adding 0 to a general purpose register).

While the embodiments herein have been described with respect to specific code replacements, any and all of the address initialization sequences described herein, or used by compilers to initialize a symbol may be replaced by another one of the sequences described herein, or having the same semantic effect as the intent of the original sequence. Thus, an address initialization sequence in PDC may be replaced by a PIC sequence to relocate a non-PIC function to a memory region beyond the location supported by the original symbol address initialization sequence, or by a sequence supporting only distances between a function address of up to 32-bit may be replaced by a sequence supporting a large offset, and so forth.

Technical effects and benefits include reduction in processor resources by rewriting default symbol address initialization sequences with more optimal initialization sequences that reduces processor resources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for linking object code comprising:
    recognizing a first symbol address initialization sequence in a module by determining that first symbol address initialization sequence corresponds with a pre-defined symbol address instruction sequence, wherein the first symbol address initialization sequence includes one or more instructions for loading an address in a first register of a processor, the one or more instructions including an instruction that depends on a value stored in a second register of the processor, the first register for storing an address of a table of contents (TOC) and the second register for storing a starting address of the module;
    determining whether to replace the first symbol address initialization sequence with a second symbol address initialization sequence by determining whether a first condition is satisfied, wherein the first condition is that the second symbol address initialization sequence has a second processor resource usage that is less than a first processor resource usage associated with the first symbol address initialization sequence; and
    replacing the first symbol address initialization sequence with the second symbol address instruction sequence when it is determined that the first condition is satisfied.

2. The method of claim 1, wherein the first symbol address initialization sequence is position independent code.

3. The method of claim 1, further comprising generating a procedure linkage table (PLT) stub for a function that calls the module, the PLT stub including an instruction to load the starting address of the module in the second register.

4. The method of claim 1, wherein the recognizing of the first symbol address initialization sequence in the module includes determining that the first symbol address initialization sequence is at a beginning of a function having at least a global function entry point and a local function entry point, wherein the global entry point is an entry point of a function call when the function call is a direct and external function call or an indirect function call, and wherein the local entry point is an entry point of a function call when the function call is a direct and local function call or a call not requiring a TOC pointer value.

5. The method of claim 4, the first condition includes that the first symbol address initialization sequence between the global and local function entry point cannot be branched into.

6. The method of claim 1, wherein the module includes position independent code (PIC), the first symbol address initialization sequence is configured for use with position independent code (PIC), and the second symbol address initialization sequence is configured for use with position dependent code (PDC).

7. The method of claim 6, wherein the first condition is that an address of the TOC pointer of the module is within a first or last 2 GB of a 64-bit address space.

8. The method of claim 1, wherein the module includes position dependent code (PDC), the first symbol address initialization sequence is configured for use with position dependent code (PDC), and the second symbol address initialization sequence is configured for use with position dependent code (PDC).

9. The method of claim 8, wherein the first condition includes that the first symbol address initialization sequence is configured to load a 64-bit address and that an address of the TOC pointer of the module is within a first or last 2 GB of a 64-bit address space.

10. The method of claim 1, wherein the first condition includes that one of relocation information or a linker switch indicates that no branches are allowed to target an address between a first and second entry point.

11. The method of claim 1, further comprising:
determining whether the first symbol address initialization sequence has a different number of instructions than the second symbol address initialization sequence; and
updating at least one function entry address when the first symbol address initialization sequence has a different number of instructions than the second symbol address initialization sequence.

12. The method of claim 1, wherein the second symbol address initialization sequence includes one or more instructions for loading an address in the first register, the one or more instructions including an instruction that includes a symbol defined by a linker that refers to the address of the TOC.

13. A computer-implemented method for linking object code comprising:
recognizing a first symbol address initialization sequence in a module by determining that first symbol address initialization sequence corresponds with a pre-defined symbol address instruction sequence, wherein the first symbol address initialization sequence includes one or more instructions for loading an address in a first register of a processor, the one or more instructions including an instruction that depends on a value stored in a second register of the processor, the first register for storing an address of a table of contents (TOC) and the second register for storing a starting address of the module;
determining whether to replace the first symbol address initialization sequence with a second symbol address initialization sequence by determining whether a first condition is satisfied, wherein the first condition is that one of relocation information or a linker switch indicates that no branches are allowed to target an address between a first and second entry point; and
replacing the first symbol address initialization sequence with the second symbol address instruction sequence when it is determined that the first condition is satisfied.

* * * * *